United States Patent [19]

Loeffler

[11] Patent Number: 4,964,253

[45] Date of Patent: Oct. 23, 1990

[54] MULTIPLE TRUSS HANGER CONNECTOR

[75] Inventor: William F. Loeffler, Bedford Heights, Ohio

[73] Assignee: Cleveland Steel Specialty Company, Maple Heights, Ohio

[21] Appl. No.: 493,350

[22] Filed: Mar. 14, 1990

[51] Int. Cl.$^5$ .......................... E04B 1/00; E04B 5/00; E04B 1/32; E04B 7/08
[52] U.S. Cl. ...................................... 52/289; 52/643; 52/702; 403/232.1
[58] Field of Search ................. 52/289, 299, 643, 702; 403/232.1

[56] References Cited

U.S. PATENT DOCUMENTS

| | | |
|---|---|---|
| 3,601,428 | 8/1971 | Gilb .................................. 403/232.1 |
| 4,291,996 | 9/1981 | Gilb . |
| 4,422,792 | 12/1983 | Gilb ........................................ 52/702 |
| 4,480,941 | 11/1984 | Gilb et al. ......................... 403/232.1 |
| 4,817,359 | 4/1989 | Colonias . |
| 4,890,436 | 1/1990 | Colonias ................................. 52/643 |
| 4,897,979 | 2/1990 | Colonias ................................. 52/643 |

OTHER PUBLICATIONS

BHT Terminal Hanger (Cleveland Steel Speciality Company).
HJ Hip and Jack Truss Hanger (Cleveland Steel Specialty Company).
THJ Truss Hip and Jack Connector (Simpson Strong-Tie Company).
THM Multiple truss Hanger (Simpson Strong-Tie Company).

Primary Examiner—Neill R. Wilson
Attorney, Agent, or Firm—Tarolli, Sundheim & Covell

[57] ABSTRACT

A single-piece, nonwelded multiple truss metal hanger connector is presented for connecting first and second supported wood members to a supporting wood member. One of the supported members is oriented at 90° with respect to the supporting member and the other supported member is oriented at a skewed angle. The connector has a flat seat for receiving the supported members and a pair of side flanges which extend perpendicularly upward from opposite side edges of the seat to form a U-shaped structure. A pair of end flanges extend perpendicularly from the rear edges of the side flanges. A pair of flange extensions extend outwardly from the forward edges of the side flanges at skewed angles. This construction permits either one of the supported members to be received by the hanger connector and oriented at 90° from the supporting member while the other one of the supported members is received by the connector and oriented at the skewed angle, thus eliminating the need for separate right hand and left hand devices.

14 Claims, 3 Drawing Sheets

MULTIPLE TRUSS HANGER CONNECTOR

BACKGROUND OF THE INVENTION

The present invention is directed to the art of building construction and, more particularly, to a metal multiple truss hanger connector for connecting a pair of supported wood members to a supporting wood member.

In the art of building construction, and particularly with respect to the construction of the frame structure of a building roof, metal connectors have been provided for assisting in connecting wooden members to each other. For example, in a hip roof structure, a pair of trusses, such as a hip truss and an end jack truss, may be connected to a header or girder which acts as a supporting member for the other two trusses. In such an application, the end jack truss is typically oriented at an angle of 90° with respect to the girder and the hip truss is typically oriented at an angle which is skewed relative to both the end jack truss as well as the girder. The hip truss may be skewed on the left side or the right side of the end jack truss.

Connectors have been known in the prior art for connecting the hip truss and the end jack truss to the girder so that the girder serves as the supporting member and the hip truss and end jack truss are the supported members. Such prior art connectors have included a multiple pocket hanger structure with each pocket serving to carry one truss and with each pocket being welded to a back plate which may, in turn, be fastened to a header or girder for supporting the trusses. One such structure is known as the BHT terminal hanger available from Cleveland Steel Specialty Company. Such a welded structure is costly and cannot be used with light gauge metal due to welding limitations.

Another connecter known in the art for connecting a hip truss and a jack truss to a girder takes the form of a product known as the HJ hip and jack truss hanger, also available from Cleveland Steel Specialty Company. Two pockets are welded to a backplate with the backplate adapted to be mounted to a girder or the like. One pocket receives a jack truss and the other pocket is skewed relative to the first pocket and the backplate and serves to receive a hip truss. Builders employing such a product must have an inventory of hip and jack truss hangers with some having the hip bucket skewed to the left and others having a hip bucket skewed to the right.

A single piece, nonwelded hip and jack connector is known in the prior art as the THJ truss hip and jack connector and is available from Simpson Strong-Tie Company, Inc. That connector is disclosed in U.S. Pat. No. 4,817,359. That connector includes a jack pocket receiving a jack member and a skewed hip pocket for receiving a hip member together with a backplate or flange so that the connector may be secured to a header or girder for supporting the hip member and the jack member. A builder utilizing such a connector will require an inventory of connectors, some of which have a hip pocket skewed to the left, and others of which have a hip pocket skewed to the right.

The prior art also includes a product known as a THM multiple truss hanger supplied by Simpson Strong-Tie Company, Inc. This product includes a truss hanger having three pockets, each for receiving a wooden member so that a central member is received along with two additional members each skewed by 45° relative to the central member. The structure is complex in that builders frequently require that two supported members be connected to a supporting member with one of the supported members being skewed relative to the other and, hence, only a two-pocket arrangement, such as the Simpson THJ truss hip jack connector is desired in either a lefthand arrangement or a righthand arrangement.

It is desirable, therefore, to provide a universal connector which takes the form of a single piece, nonwelded hip and jack connector which may be used to connect a jack member and a hip member, skewed either to the left or to the right, with the connector having flanges for flush mounting against a header or girder for supporting the hip and jack members.

SUMMARY OF THE INVENTION

In accordance with the present invention, a single-piece, nonwelded multiple truss hanger connector is provided for use in connecting first and second supported wood members, such as a hip and a jack, to a supporting wood member, such as a girder or header, wherein one of the supported members is oriented at 90° with respect to the supporting member and the other supported member is oriented at a skewed angle relative to the supporting member and the other supported member. The hanger connector includes a metal structure having a flat seat for receiving the first and second supported members. First and second side flanges extend perpendicularly upward from opposite side edges of the seat so as to form a U-shaped structure with each of the side flanges adapted for flush mounting against one of the supported members. First and second end flanges extend perpendicularly away from the rear edges of the first and second side flanges, respectively. These end flanges are adapted for flush mounting against the supporting member. First and second flange extensions respectively extend outwardly from the forward edges of the first and second side flanges. Each of these extensions extend outwardly at a skewed angle relative to its side flange with the skewed angles being equal to each other. Each of the extensions may be flush mounted against one of the first and second supported members. By constructing the hanger connector in the manner described above, either one of the supported members may be received by the hanger connector and oriented at 90° from the supporting member and flush mounted against one of the side flanges, while the other one of the supported members is received by the hanger connector and oriented at the skewed angle and mounted flush against the flange extension extending at a skewed angle from the other one of the side flanges. This provides a universal structure which may be employed for connecting a hip truss, skewed either to the right or to the left, with an end jack truss oriented at 90° relative to a header or girder.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF THE PREFERRED EMBODIMENT

Figure 1:
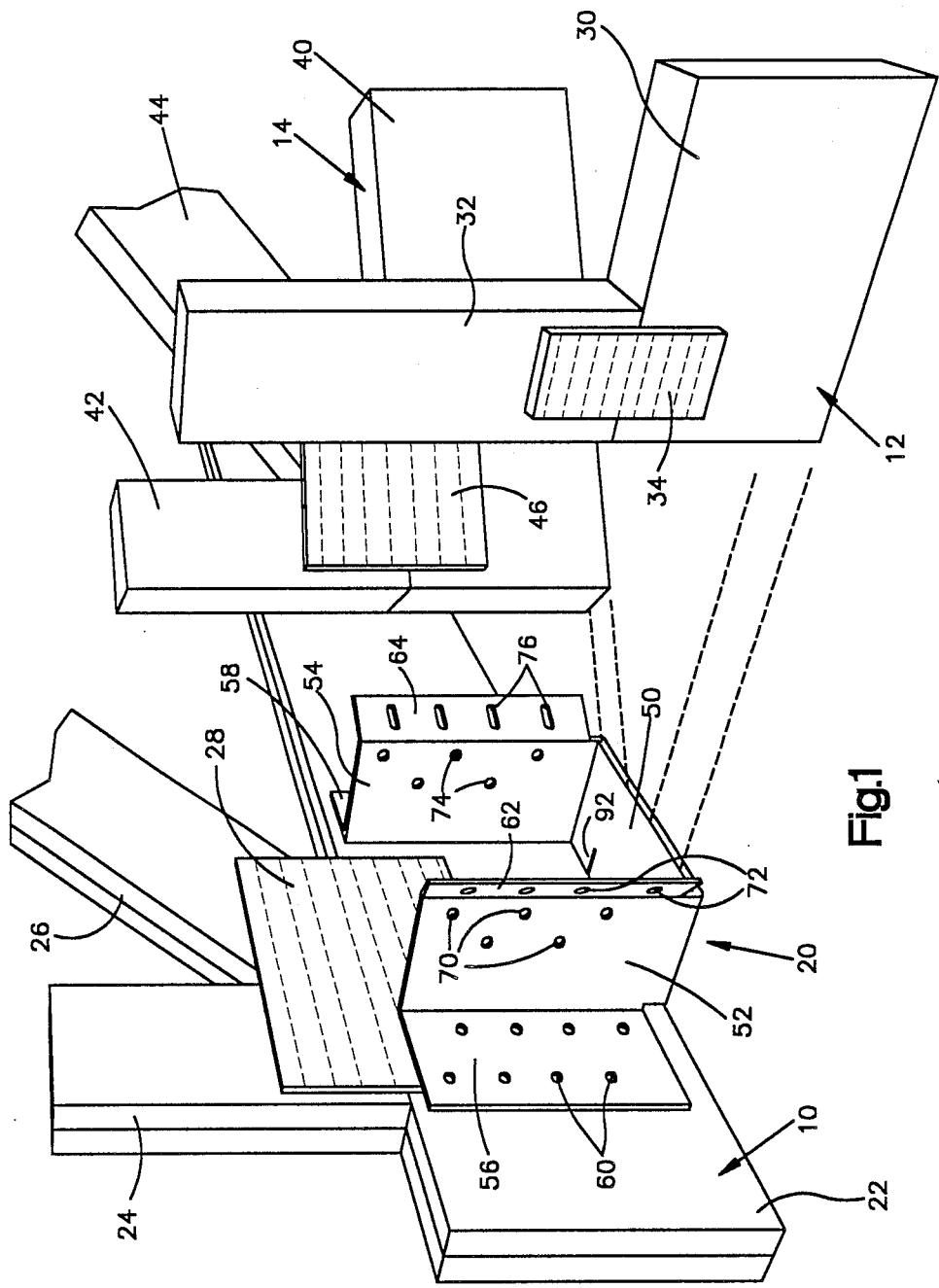
FIG. 1 is a perspective view of one embodiment of the invention for connecting a hip truss and an end jack truss to a grinder.
Figure 2:
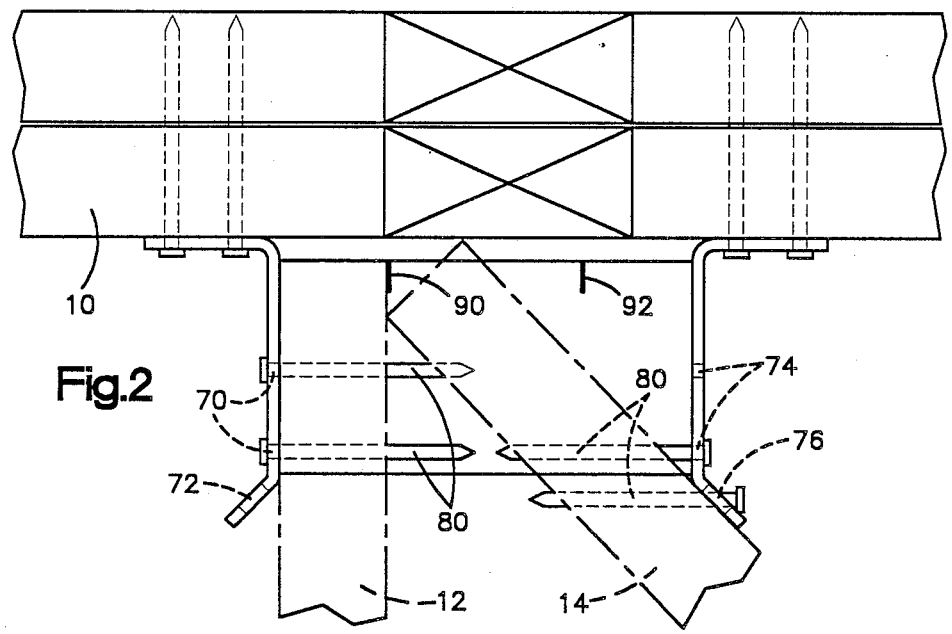
FIG. 2 is a top plan view of the connector of FIG. 1 showing the hip truss skewed to the right.

Reference is now made to the drawings wherein the showings are for purposes of illustrating a preferred embodiment of the invention only and not for purposes of limiting same. FIG. 1 illustrates an application of the present invention for connecting a pair of wood members to a supporting wood member. More specifically, in this application of the invention, the supporting member takes the form of a double ply girder 10. One supported member takes the form of a single ply end jack truss 12 oriented at 90° with respect to the girder 10. The second supported member takes the form of a single ply hip truss 14 which is oriented at a skewed angle relative to the girder 10 as well as to the end jack truss 12. The skewed angle may, for example, be on the order of 45°. As shown in FIGS. 1 and 2, the hip truss 14 is skewed to the right of jack truss 12. In the application shown in FIG. 3, the hip truss 14 is skewed to the left of the jack truss 12. In the construction of a hip roof, it is common to have the need to connect a skewed hip truss as well as an end jack truss to a supporting girder as in the examples given in FIGS. 1, 2 and 3.

Figure 4:
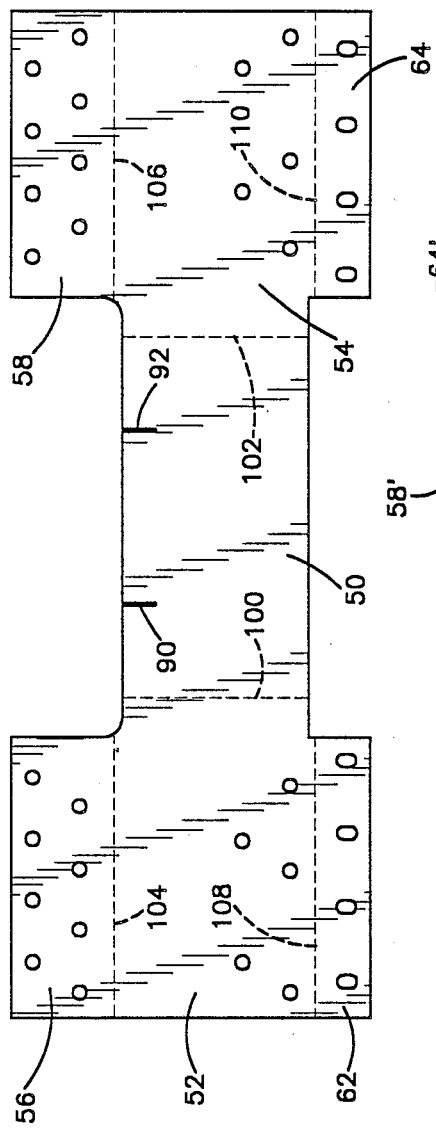
FIG. 4 is a plan view of the hanger connector blank.

The present invention provides a hanger connector 20 which is universal in its application for connecting an end jack truss together with a hip truss, skewed to the left or to the right, to a girder truss. Consequently, there is no need for the builder to maintain an inventory of connectors, some of which are designed for hip trusses skewed to the left and others of which are designed for hip trusses that are skewed to the right. Moreover, since the connector 20 is formed from a single-piece, non-welded structure, it is relatively inexpensive as compared with multiple piece welded structures. The connector 20 may be constructed from a blank as illustrated in FIG. 4 made of 12-gauge steel and having a galvanized finish.

Having now briefly described an application of the invention for connecting a hip truss and an end jack truss with a girder truss, attention is now directed to a more detailed discussion of the application as well as to a more detailed discussion of the construction of the hanger connector 20.

The girder truss 10 may take the form of a two-ply construction including a bottom chord 22, a vertically extending web 24, and a diagonally extending web 26. Webs 24 and 26 are each comprised of two-ply wooden members measuring two inches by four inches. The bottom chord 22 may take the form of a two-ply wooden member measuring two inches by six inches. The bottom chord 22 and webs 24 and 26 are coplanar and are held together with rectangular truss plates 28, secured on opposing vertical faces of the structure in a conventional fashion. Only one truss plate 28 is visible in FIG. 1. Webs 24 and 26 extend upwardly and interconnect with a top chord (not shown), as is conventional.

The end jack truss 12 is constructed of single-ply two inch by four inch wooden members with the horizontally extending member serving as a bottom chord 30 and the vertically extending member serving as a vertical web 32. These interconnect with a top chord (not shown) as is conventional. The bottom chord 30 and the vertically extending web 32 are coplanar and are held in place with truss plates 34 (only one shown in FIG. 1) secured to opposing vertical faces thereof.

The hip truss 14 (sometimes referred to as a corner truss) conventionally includes a single-ply construction including a two inch by six inch bottom chord 40, a two inch by four inch vertically extending web 42, and a two inch by four inch diagonal web 44. The bottom chord 40 and webs 42 and 44 are coplanar and interconnect with a top chord (not shown) as is conventional. The bottom chord and webs 42 and 44 are interconnected as with a pair of truss plates 46 (only one shown in FIG. 1).

Figure 3:
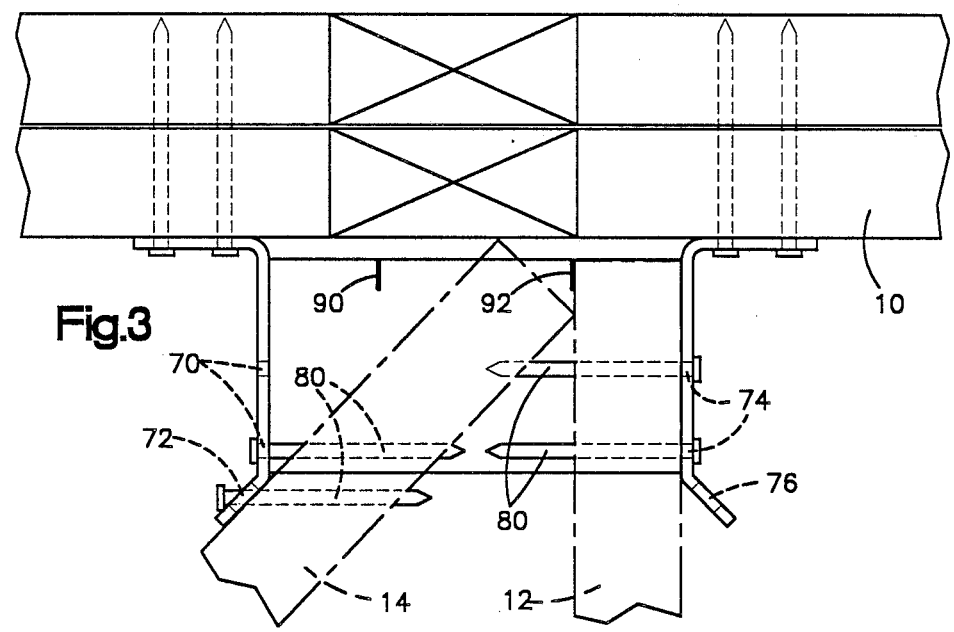
FIG. 3 is a top plan view similar to that of FIG. 2 but showing the hip truss skewed to the left.

Attention is now directed to the hanger connector 20 which is formed from a single-piece, nonwelded metal blank as shown in FIG. 4. The connector has a flat rectangular seat 50 having an upper surface that serves as a bearing surface for receiving the bottom chords 30 and 40 of the end jack truss 12 and the hip truss 14, respectively. The seat 50 is sufficiently wide to receive the trusses and, for example, may be of a width on the order of 5 ⅛ inches and a depth from its front edge to its rear edge on the order of 3 inches. First and second supported member side flanges 52 and 54 extend perpendicularly upward from opposite side edges of the seat 50 so as to form a U-shaped structure. The inner surfaces of the side flanges 52 and 54 are flat and rectangular in shape so that each inner surface is adapted for flush mounting against the vertical surface of an end jack truss 12 as is shown in the applications of FIGS. 2 and 3. Side flanges 52 and 54 extend upwardly from the seat 50 by equal amounts, such as on the order of 5 3/16 inches.

First and second supporting member end flanges 56 and 58 extend perpendicularly outwardly in opposing directions from the rear edges of the side flanges 52 and 54, respectively. Thus, the end flanges 56 and 58 are coplanar. Each end flange is rectangular in shape and its back surface is flat so that it may be mounted flush against a vertical face of a supporting member such as the bottom chord 22 of girder 10. Each end flange is provided with eight apertures 60, each for receiving a fastening device, such as a nail, for securing the hanger connector 20 to the girder 10. preferably, the apertures 60 are arranged in two spaced apart vertical columns of four apertures each with the apertures in the respective columns being staggered from each other. The end flanges 56 and 58 are not co-extensive with the height of side flanges 52 and 54 as each has its bottom edge spaced vertically upward from the bottom edge of the side flanges 52 and 54 by a distance on the order of 9/16 of an inch to facilitate manufacture. The upper edges of flanges 56 and 58 are in the same plane as the upper edges of flanges 52 and 54.

First and second flange extensions 62 and 64 extend outwardly from the forward edges from the first and second side flanges 52 and 54, respectively. These extensions extend outwardly at a skewed angle as is best seen in the top plan views of FIGS. 2 and 3. This angle may be on the order of 45°. Extensions 62 and 64 are essentially rectangular in shape and extend outwardly from the side flanges 52 and 54 by a distance sufficient for a fastener opening. The inner surface of each flange is flat so that it may be mounted flush against a vertical surface such as that provided by hip truss 14 and a illustrated in FIGS. 2 and 3. The flange extensions 62 and 64 are not co-extensive with the side flanges 52 and 54. Instead, the lower edges of flanges 62 and 64 are spaced upwardly from seat 50 by a short distance such as 9/16 of an inch to facilitate in the manufacturing operation. The upper edges of flanges 62 and 64 fall in the same plane as the upper edges of side flanges 52 and 54.

Side flange 52 has two vertical columns of apertures 70 which are staggered from each other as well as with respect to the vertical column of horizontal slots 72 in the extension 62. Similarly, side flange 54 is provided with two vertical columns of apertures 74 with the apertures in the two columns being staggered relative to each other and relative to a vertical column of horizontal slots 76 in the extension 64. Thus, each side flange together with its associated extension provides three vertical columns of apertures (either circular, as in the case of apertures 70 and 74, or slotted as in the case of slots 72 and 76). In assembly, only two of the three vertical columns of apertures are employed for securing the connector to a supported member, such as an end jack truss 12 or a hip truss 14. This is illustrated in FIGS. 2 and 3 from which it is seen that only the two columns of apertures 70 or 74 are employed in fastening the connector to a jack truss 12 with nails 80 extending through the apertures. In this application, the slots 72 and 76 are not employed. However, when the connector is fastened to a hip truss 14, as with nails 80, only the central column of apertures 70 or 74 is employed together with the slots 72 or 76 as illustrated in FIGS. 2 and 3.

The upper surface of the seat 50 is provided with alignment means for use in assisting in correctly placing the supported members 12 and 14 on the seat. This alignment means takes the form of a pair of grooves 90 and 92 formed as by embossing. Each of these grooves 90 and 92 extends in a straight line parallel to the side flanges 52 and 54 with the grooves starting from the rear edge of the seat 50 and extending toward the front edge of the seat by a distance on the order of ⅛ of an inch. Each groove 90 and 92 is spaced inwardly from an adjacent side flange by a distance on the order of the thickness of a wooden truss, such as on the order of slightly more than two inches. These alignment grooves provide a builder with visual assistance when positioning the hanger connector at its proper location on the bottom chord 22 of the supporting member in relationship to the vertical web 24.

Reference is now made to FIG. 4 which illustrates a blank for forming the connector 20. The blank includes 90° bend-up fold lines 100 and 102 which define the width of seat 50. When the left and right sides are bent up by 90°, this will provide the side flanges 52 and 54. Side flange 52 has a bend-down by 90° fold line 104 for defining the end flange 56. Similarly, side flange 54 has a bend-down by 90° fold line 106 for defining the end flange 58. Side flange 52 also has a bend-down by 45° fold line 108 for defining the extension 62. Similarly, side flange 54 has a fold-down by 45° fold line 110 for defining the extension 64.

Figure 5:
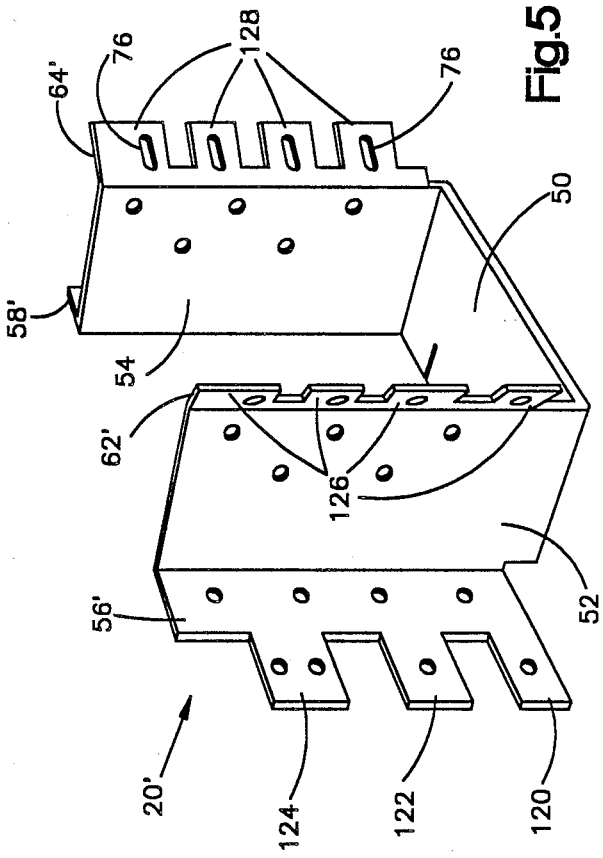
FIG. 5 is a perspective view similar to that of FIG. 1 illustrating a second embodiment of the invention.

Reference is now made to FIG. 5 which illustrates a second embodiment of the invention. As this embodiment closely resembles that of the first embodiment, only the differences between the two will be discussed in detail. Consequently, like character references are employed for illustrating like characteristics and components. In this embodiment, the hanger connector 20, corresponds very closely with that of the connector 20 illustrated in FIGS. 1–5 but differs therefrom only in the construction of end flanges 56' and 58' as well as extensions 62' and 64'. The rest of the structure is identical. In the embodiment of FIGS. 1–4, the end flanges 56 and 58 are continuous and not interrupted. In the embodiment of FIG. 5, the end flanges 56' and 58' are irregular or discontinuous, forming tabs, such as tabs 120, 122 and 124. These tabs are formed by cutting away portions of the end flange. The tabs 120, 122 and 124 each contain one or more apertures for use in fastening the end flange to a girder as with nails and the like.

In the embodiment illustrated in FIGS. 1–4, each of the extensions 62 and 64 is continuous and not interrupted. In the embodiment of FIG. 5, the extensions 62' and 64' are noncontinuous, providing tabs 126 on extension 62' and tabs 128 on extension 64'. These tabs 126 and 128 are defined by cutting away portions of the extensions 62' and 64'. Tabs 126 are coplanar and tabs 128 are coplanar. Each tab 126 includes a slotted aperture for use in fastening the tabs 126 to a hip truss 14 as with nails. Similarly, each of the extension tabs 128 is provided with a slotted aperture so the tabs 128 may be fastened to a hip truss 14 as with nails.

Although the invention has been described in conjunction with preferred embodiments, it is to be noted that various modifications and arrangements may be made without departing from the spirit and scope of the invention as defined by the appended claims.

Having described a preferred embodiment of the invention, the following is claimed:

1. A single-piece, non-welded multiple truss metal hanger connector for connecting first and second supported wood members to a supporting wood member wherein one of said supported members is oriented at 90° with respect to said supporting member and the other said supported member is oriented at a skewed angle relative to said supporting member and said one supported member; said hanger connector comprising:

a single-piece metal structure having a flat seat for receiving said first and second supported members;

first and second supported member side flanges extending perpendicularly upward and parallel to each other from opposite side edges of said seat so as to form a U-shaped structure with each of said supported member side flanges adapted for flush mounting against one of said first and second supported members;

first and second supporting member end flanges extending perpendicularly from the rear edges of said first and second supported member side flanges, respectively, each of said end flanges having a flat surface adapted for flush mounting against said supporting member; and first and second flange extensions extending outwardly from the forward edges of said first and second supported member flanges, respectively, each said extension extending outwardly at a skewed angle relative to its supported member flange, the skewed angles being equal, each of said extensions adapted for flush mounting against one of said first and second supported members, whereby either one of said supported members may be received by said hanger connector and oriented at 90° from said supporting member and mounted flush against one of said supported member side flanges while the other one of said supported members is received by said hanger connector and oriented at said skewed angle and mounted flush against the flange extension extending at said skewed angle from the other one of said supported member side flanges.

2. A connector as set forth in claim 1 wherein said seat is flat and rectangular in shape and bounded by front and rear edges extending parallel to each other and first and second side edges extending parallel to each other and respectively terminating in said upwardly extending first and second side flanges.

3. A connector as set forth in claim 2 wherein said seat has an upper surface serving as a bearing surface for receiving said first and second supported members, said upper surface having alignment means thereon for assisting in correctly positioning said hanger connector on said supporting member.

4. A connector as set forth in claim 3 wherein said alignment means includes first and second alignment grooves formed in said upper surface.

5. A connector as set forth in claim 4 wherein each said groove extends in a straight line parallel to said side edges and from said rear edge toward said front edge of said seat.

6. A connector as set forth in claim 1 wherein said end flanges extend perpendicularly outward in opposing directions from the rear edges of said first and second side flanges, respectively.

7. A connector as set forth in claim 6 wherein said seat is flat and rectangular in shape and bounded by front and rear edges extending parallel to each other and first and second side edges extending parallel to each other and respectively terminating in said upwardly extending first and second side flanges.

8. A connector as set forth in claim 7 wherein said seat has an upper surface serving as a bearing surface for receiving said first and second supported members, said upper surface having alignment means thereon for assisting in correctly positioning said hanger connector on said supporting member.

9. A connector as set forth in claim 8 wherein said alignment means includes first and second alignment grooves formed in said upper surface.

10. A connector as set forth in claim 1, wherein each said end flange is rectangular in shape providing a substantially continuous flat surface for flush mounting against said supporting member.

11. A connector as set forth in claim 1, wherein each said end flange includes a plurality of coplanar tabs each having at least one aperture therein for use in securing said flange to said supporting means with fastening means extending through said apertures.

12. A connector as set forth in claim 1 wherein each said extension is rectangular in shape providing a substantially continuous flat surface for flush mounting against a said supported member.

13. A connector as set forth in claim 1 wherein each said extension includes a plurality of coplanar extension tabs each having an aperture therein for use in securing said extension to a said supported member with fastening means extending through said apertures.

14. A single-piece, non-welded metal hanger connector for connecting a supported wood member to a supporting wood member wherein said supported member is oriented at either a right hand or a left hand skewed angle relative to said supporting member; said hanger connector comprising:

a single-piece metal structure having a flat seat for receiving said supported member;

first and second side flanges extending perpendicularly upward and parallel to each other from opposite side edges of said seat so as to form a U-shaped structure;

first and second supporting member end flanges extending perpendicularly outward in opposing directions from the rear edges of said first and second side flanges, respectively, each of said end flanges having a flat surface adapted for flush mounting against said supporting member; and first and second flange extensions extending outwardly from the forward edges of said first and second side flanges, respectively, each said extension extending outwardly at a skewed angle relative to its side flange so that said first flange extension is skewed to the left and said second flange extension is skewed to the right, each of said extensions adapted for flush mounting against said supported member, whereby said supported member may be received by said hanger connector and oriented at either a said right hand skewed angle or a said left hand skewed angle and mounted flush against one of said flange extensions.

* * * * *